US011403082B1

(12) United States Patent
Mehta et al.

(10) Patent No.: US 11,403,082 B1
(45) Date of Patent: Aug. 2, 2022

(54) SYSTEMS AND METHODS FOR INCREASED BANDWIDTH UTILIZATION REGARDING IRREGULAR MEMORY ACCESSES USING SOFTWARE PRE-EXECUTION

(71) Applicant: HEWLETT PACKARD ENTERPRISE DEVELOPMENT LP, Houston, TX (US)

(72) Inventors: Sanyam Mehta, Bloomington, MN (US); Gary William Elsesser, Bloomington, MN (US); Terry D. Greyzck, Bloomington, MN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/245,310

(22) Filed: Apr. 30, 2021

(51) Int. Cl.
  *G06F 8/41* (2018.01)
  *G06F 12/1027* (2016.01)
  *G06F 9/32* (2018.01)
  *G06F 9/30* (2018.01)
  *G06F 9/38* (2018.01)

(52) U.S. Cl.
  CPC ........ *G06F 8/4442* (2013.01); *G06F 9/30138* (2013.01); *G06F 9/325* (2013.01); *G06F 9/3802* (2013.01); *G06F 12/1027* (2013.01)

(58) Field of Classification Search
  None
  See application file for complete search history.

(56) References Cited

U.S. PATENT DOCUMENTS

| 7,155,575 | B2 * | 12/2006 | Krishnaiyer | G06F 9/3455 712/E9.047 |
| 7,530,063 | B2 * | 5/2009 | Archambault | G06F 8/4442 717/160 |
| 8,146,064 | B2 * | 3/2012 | Chen | G06F 12/0862 711/213 |
| 8,239,841 | B2 | 8/2012 | Chen et al. | |
| 8,839,219 | B2 | 9/2014 | Alvanos et al. | |
| 9,471,289 | B2 * | 10/2016 | Feng | G06F 8/51 |
| 9,798,528 | B2 * | 10/2017 | Gao | G06F 8/4441 |

OTHER PUBLICATIONS

Brown, A. D. et al., "Compiler-Based I/O Prefetching for Out-of-Core Applications," ACM Transactions on Computer Systems, May 2001, pp. 111-170, vol. 19, No. 2, https://www.pdl.cmu.edu/PDL-FTP/TIP/tocs01.pdf, ACM.

(Continued)

*Primary Examiner* — Marina Lee
(74) *Attorney, Agent, or Firm* — Sheppard, Mullin, Richter & Hampton

(57) ABSTRACT

Systems and methods are configured to receive code containing an original loop that includes irregular memory accesses. The original loop can be split. A pre-execution loop that contains code to prefetch content of the memory can be generated. Execution of the pre-execution loop can access memory inclusively between a starting location and the starting location plus a prefetch distance. A modified loop that can perform at least one computation based on the content prefetched with execution of the pre-execution loop can be generated. Execution of the main loop can to follow the execution of the pre-execution loop. The original loop can be replaced with the pre-execution loop and the modified loop.

20 Claims, 9 Drawing Sheets

(56) References Cited

OTHER PUBLICATIONS

Chen, T. et al., "Prefetching Irregular References for Software Cache on Cell," CGO'08, Apr. 5-10, 2008, 10 pgs., https://researcher.watson.ibm.com/researcher/files/us-zsura/cgo08_cellprefetch.pdf, ACM, Boston, MA, USA.

University of Colorado, Colorado Springs, "Cache Management—Improving Memory Locality and Reducing Memory Latency," retrieved online Nov. 3, 2020, 19 pgs. http://www.cs.uccs.edu/~qyi/UTSA-classes/cs6363/slides/Ch09CacheSlides.pdf.

Jimborean et al., "Fix the code. Don't tweak the hardware: A new compiler approach to Voltage-Frequency scaling", In Proceedings of Annual IEEE/ACM International Symposium on Code Generation and Optimization, 2014, 10 pages.

Koukos et al., "Towards More Efficient Execution: A Decoupled Access-Execute Approach", ACM, Jun. 10-14, 2013, 11 pages.

* cited by examiner

200

```
1.  for (i=0; i<NUPDATE/128; i++) {
2.  /* the j-loop is vectorizable with ivdep per rules */
3.  for (j=0; j<128; j++) {
4.    ran[j] = (ran[j] << 1) ^ ((int64_t) ran[j] < 0 ? POLY : 0);
5.    Table[ran[j] & (TableSize-1)] ^= ran[j];
6.  }
7.  }
```

```
1.  for (i=0; i<NUPDATE/128; i++) {
2.  for (j=0; j<128; j++) {
3.    if ((j+PD) < 128) {
4.      temp = (ran[j+PD] << 1) ^ ((int64_t) ran[j+PD] < 0 ? POLY : 0);
5.      #pragma prefetch (level(L)) Table[temp & (TableSize-1)]
6.    }
7.    ran[j] = (ran[j] << 1) ^ ((int64_t) ran[j] < 0 ? POLY : 0);
8.    Table[ran[j] & (TableSize-1)] ^= ran[j];
9.  }
10. }
```

```
1.  for (i=0; i<NUPDATE/128; i++) {
2.      for (j=0; j<128; j+=PD) {                                    — 224
3.          /* this pre-execution loop is also vectorizable */
4.          for (pre=j;pre<min((j+PD),128);pre++) {
5.              temp = (ran[pre] << 1) ^ ((int64_t) ran[pre] < 0 ? POLY : 0);
6.              #pragma prefetch (level(L))  Table[temp & (TableSize-1)]
7.          }                                                         — 222
8.          /* this main-loop remains vectorizable like in the original code */
9.          for (main=j;main<min((j+PD),128);main++) {
10.             ran[main] = (ran[main] << 1) ^ ((int64_t) ran[main] < 0 ? POLY : 0);
11.             Table[ran[main] & (TableSize-1)] ^= ran[main];
12.         }
13.     }
14. }
```

226 at line 9, 228 at line 12

```
1   for (k = k1; k < oldk2; k++) {
2       const int64_t v = vlist[k];
3       const int64_t veo = XENDOFF(v);
4       int64_t vo;
5   #pragma prefetch_irregular strip_length(n)
6       for (vo = XOFF(v); vo < veo; vo++) {
7           const int64_t j = xadj[vo];
8   #pragma prefetch (level(2), lines(1)) bfs_tree[j]
9           if (bfs_tree[j] == -1) {
10              bfs_tree[j] = v;
11              vlist[k2++] = j;
12          }
13      }
14  }
```

FIG. 4

```
1   foreach candidate loop, L:
2     // disallow if early exit.
3     // disallow if contains call that may feed load/store address.
4     sm = strip_length(L);        // may be specified by directive.
5     tb = trips_bound(L);
6     if not known(tb) or tb > sm then
7       stripmine(L);  // hereafter L names inner loop.
8     endif
9     DL = replicate_loop(L);
10    insert_as_elder_sibling(DL, L);  // place duplicate DL before L.
11    ALS = {};                    // collect all flattened loads/stores.
12    foreach array load/store in DL, LS:
13      tmp = new_temp(type(LS))
14      new_stmt = insert_before("tmp = LS", stmt(LS));
15      add new_stmt to ALS;
16      replace LS with tmp;
17    FG = feed_graph(DL);         // stmt pairs { (from, to) }
18    FG = transitive_closure(FG);
19    CS = {};                     // collect prefetch candidates.
20    foreach stmt in ALS, S:
21      if not exists (S, use) in FG then
22        if no VARS directive or base(S) in VARS then
23          add S to CS;
24        endif
25      endif
26    foreach stmt in CS, S:
27      replace S of form "tmp = LS" with "prefetch(LS)"
28    // later, DCE removes unnecessary code in prefetch loop
```

SYSTEMS AND METHODS FOR INCREASED BANDWIDTH UTILIZATION REGARDING IRREGULAR MEMORY ACCESSES USING SOFTWARE PRE-EXECUTION

DESCRIPTION OF RELATED ART

In today's world of computing, high bandwidth memories (HBMs) have arrived to supplement/replace traditional double data rate (DDR) memories. The HBMs offer significant improvements in peak theoretical bandwidth compared to the DDR memories. Some applications previously known for being memory bandwidth bound with the DDR memories are no longer so with the HBMs. Instead, the applications are now memory latency bound. Existing CPUs offer some hardware-based solutions, including hardware prefetchers, to mitigate the memory latency-related stalls but the hardware-based solutions may not succeed in mitigating those stalls and, thus, improve bandwidth utilization in some applications with irregular memory accesses.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 2A-2C illustrate example codes with an original loop with irregular accesses, a loop with conventional software prefetching, and the original loop preceded by the proposed pre-execution loop, respectively, according to an embodiment of the present technology.

FIG. 4 illustrates an example code that applies software pre-execution to hash-join benchmark using proposed pragmas, according to an embodiment of the present technology.

FIG. 5 illustrates a pseudo code for implementing software pre-execution, according to an embodiment of the present technology.

Figure 1:
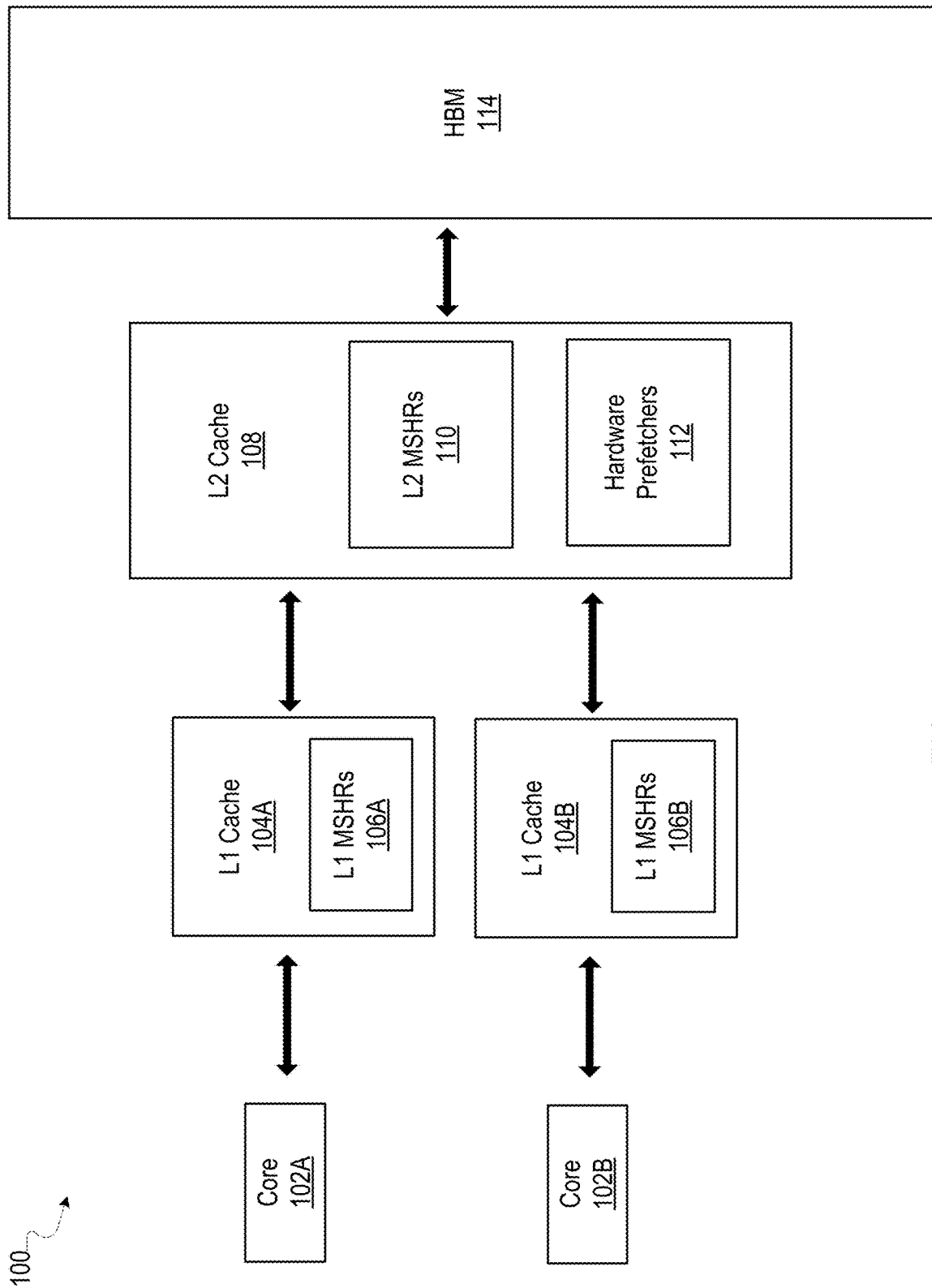
FIG. 1 illustrates an example block diagram of hardware components, according to an embodiment of the present technology.

The figures are not exhaustive and do not limit the present disclosure to the precise form disclosed.

DETAILED DESCRIPTION

Continuing increase in processor core count has been a driving force in performance gains. In DDR memory era, some applications could not fully enjoy performance gains of the increased processor cores due to the limited bandwidth DDR memories offered. Introduction of HBMs answered the DDR memories' limited bandwidth problem. For example, a DDR4-2666 memory has a peak theoretical bandwidth of 128 GB/s. In contrast, an HBM2 memory can offer a peak theoretical bandwidth of 1024 GB/s, which is 8 times greater than that of the DDR4-2666. As a result, applications that were previously memory bandwidth bound with the DDR memories are no longer so in the HBM era. Instead, performances of the applications are now limited by stalls caused by raw latency associated with memory accesses (even though there may be no additional latency due to bandwidth contention). In other words, the applications are now memory latency bound instead of memory bandwidth bound.

The processor cores offer some hardware support to mitigate memory latency issues. For instance, the processor cores provide hardware prefetchers that can prefetch data that are likely to be used in later operations. The hardware prefetchers can retrieve data from the HBMs independently of computing operations of the processor cores. By readying the data before they are needed during the later operations, the hardware prefetchers can effectively hide memory latency associated with waiting for the data to become available. It is observed that applications with regular memory accesses (e.g., streams benchmark) enjoy the benefits of the hardware prefetchers. However, it is also observed that applications with irregular memory accesses (e.g., RandomAccess and ISx benchmarks) currently do not fully enjoy the benefits of the hardware prefetchers for various reasons that will be discussed with more details with respect to FIG. 1. Irregular memory access can be defined as any memory access that does not access memory sequentially. For example, irregular memory access can include memory access where address calculation for data to be accessed involves another memory access. Accordingly, current approaches leave much to be desired for irregular memory accesses.

An improved approach rooted in computer technology overcomes the foregoing and other disadvantages associated with the conventional approaches specifically arising in the realm of computer technology. Based on computer technology, the present technology provides a software-based approach that can reduce stalls caused by irregular memory accesses. The software-based approach can modify existing code to better utilize the hardware and reduce the stalls. Additionally, the software-based approach can preserve some of desirable features of the existing code including preservation of vectorization, handling of short loops, avoiding performance bottlenecks, amenability to threading, etc. The present technology can receive code that contains an original loop as an input and strip-mine the original loop. The original loop can be split into a pre-execution loop and a modified loop. The pre-execution loop can contain memory accesses and address generation, and prefetch the last memory accesses for later use by the modified loop. Code that replaces the original loop with the pre-execution loop and the modified loop can be generated as an output.

FIG. 1 illustrates an example block diagram 100 of hardware components, according to an embodiment of the present technology. In the block diagram 100, a processor core 102A, 102B can communicate with a corresponding L1 cache 104A, 104B. The L1 cache 104A, 104B can include a corresponding set of L1 miss status handling registers (L1 MSHRs) 106A, 106B. Each of the L1 caches 104A, 104B can communicate with a L2 cache 108, which can include L2 MSHRs 110 and hardware prefetchers 112. The L2 cache 108 can communicate with a HBM 114. Each of the MSHRs 106A, 106B, 110 limits a number of outstanding memory requests supported by the processor core 102A, 102B at a corresponding level of cache 104A, 104B, 108.

In the example block diagram 100, it is observed that bandwidth utilization can be especially poor for irregular memory accesses. Bandwidth utilization is a function of number of outstanding memory requests in the processor cores 102A, 102B (or memory-level parallelism (MLP) generated by applications). Since memory latency associated with retrieving data from the HBM 114 is similar regardless of regular and irregular accesses (i.e., the same memory latency for a cold cache), the poor bandwidth utilization of irregular memory accesses can be traced to the number of outstanding memory requests in the processor cores 102A, 102B. The maximum number of outstanding memory requests in a core is determined by a size of a MSHR queue at each level of cache 104A, 104B, 108. The maximum size of the MSHR queue at each level of cache 104A, 104B, 108 is determined by a number of MSHRs 106A, 106B, 110 at that level of cache. Typically, a size of the L1 MSHRs 106A, 106B is smaller than L2 MSHRs 110. As an example, an A64FX processor provides only 12 L1 MSHRs but provides 256 L2 MSHRs shared among 12 cores in a cluster which is nearly 21 L2 MSHRs per a processor core.

As shown in the example block diagram 100, the hardware prefetchers 112 operates at L2 cache 108 and, thus, the hardware prefetchers 112 can make use of the greater number of the L2 MSHRs 110 to push more requests out to the HBM 114. In case of regular memory accesses (e.g., streams benchmark), the hardware prefetchers 112 may be fully utilized to achieve better bandwidth utilization. However, the hardware prefetchers 112 can remain mostly idle for irregular memory accesses (e.g., RandomAccess and ISx benchmarks) and do not make use of the greater number of the L2 MSHRs 110. The present technology provides a software-based approach that can fully leverage L2 MSHRs 110 to reduce stalls caused by irregular memory accesses. The software-based approach is described with more details in relation to FIGS. 2A-2C.

FIGS. 2A-2C illustrate example codes 200, 210, 220 with an original loop with irregular accesses, a conventional loop, and an improved loop, respectively, according to an embodiment of the present technology. The example codes 200, 210, 220 each implement the RandomAccess benchmark to illustrate operation of the loops that perform irregular memory accesses. One having ordinary skill in the art will readily recognize that the example codes 200, 210, 220 are for illustrative purpose only and various techniques within the improved loop can broadly apply to any code with irregular memory accesses.

The RandomAccess benchmark tests performance of processor cores when performing random memory accesses. This is achieved using indexed array accesses (shown in lines 4 and 5 in the example code 200 of FIG. 2A) to the "Table" array 204, where an index 206 used for the accesses is obtained based on a "ran" array 202 comprising numbers generated using a random number generator. The memory accesses at line 5 are irregular memory accesses as the memory accesses for the "Table" array 204 involves another memory access of "ran" array 202. In the RandomAccess benchmark, a size of the "Table" array 204 is specified to be much larger than the last level cache size (e.g., the L2 cache 108 of FIG. 1) such that every or nearly every memory access reaches out to an external memory (e.g., the HBM 114 of FIG. 1). The RandomAccess benchmark allows vectorization and the example code 200 implements the vectorization at line 3 with a 128-length vector in its "j" loop 208. Some instruction sets (e.g., ARMv8 instruction set) of certain processor cores (e.g., A64FX) support scalable vector extensions (SVE). Vectorization can provide performance improvements of more than 20%. As will be described with more details in reference to the example code 210 of FIG. 2B, conventional approaches that attempt to prefetch the contents of the "Table" array 204 can render code vectorization-unfriendly and, thus, lose the additional performance improvements offered by the SVE.

The example code 210 of FIG. 2B illustrates a loop with conventional software prefetching (a conventional loop) that prefetches content of "Table" array 212. The example code 210 inserts prefetch instructions that populate the "Table" array 212 at line 5 with a directive "prefetch". The "Table" array 212 is prefetched a few iterations (equal to the prefetch distance, "PD" 216) ahead using an index 214 that is pre-calculated. The prefetching the "Table" array 212 needs an actual load of a value "ran[j+PD]" using an index 214 "j+PD". However, the index 214 can access a memory address outside a defined boundary and can result in a memory fault. To prevent the memory fault, conditional code at line 3 that did not exist in the example code 200 of FIG. 2A is needed.

The prefetching in the conventional loop of the example code 210 has two significant drawbacks. First, the conditional code breaks vectorization in the example code 200. Generally, a compiler may either vectorize a loop or allow prefetches with conditional code because a combination of both (e.g., vectorization with conditional code) requires some level of predication often associated with a considerable instruction overhead. Further, even if vectorization is of no concern, conditional code in the loop (especially in the innermost loop) can cause considerable instruction overhead and is not desirable.

Second, where the innermost loop (e.g., the "j"-loop at line 2) is a short loop, a selected prefetch distance 216 cannot be very small as the innermost loop may complete before the prefetching of data into the "Table" array 212 completes. In other words, a short innermost loop may not effectively hide memory latency with very small prefetch distance 216.

The example code 220 of FIG. 2C illustrates the original loop preceded by the proposed pre-execution loop (an improved loop) that enables prefetching of content of "Table" array 222 without disadvantages of the example code 210 of FIG. 2B. The example code 220 is illustrative of two compiler optimizations: (1) strip-mining an original loop (e.g., "j" loop 208 in the example code 200 of FIG. 2A) by a factor equal to a prefetch distance "PD" 224 and (2) inserting a pre-execution loop ("pre" loop) 226 before a modified loop ("main" loop) 228. Thus, the example code 220 splits the original loop into two new loops.

In the improved loop, the original loop "j" can be strip-mined by a factor equal to the prefetch distance 224 at line 2. The pre-execution loop 226 can include instructions that only perform memory accesses (e.g., "ran[pre]" at line 4 and "Table[temp & (TableSize-1)]" at line 6) and needed address generation (e.g., "temp" at line 5) of the original loop. The last memory accesses that leverage the memory accesses and the generated addresses (e.g., "Table[temp & (TableSize-1)]") can be converted into prefetches using a prefetch directive at line 6. The last memory accesses can be determined by a compiler using various graph algorithms on the internal representation used. The prefetch directive can designate a specific cache (e.g., L2 cache designated at line 6) for prefetched data. The pre-execution loop 226 can be empty of any store operations that can go out to an external memory (e.g., the HBM 114 of FIG. 1) and, thus, avoids side-effects of the store operations. The conversion of the last memory accesses (i.e. those that have no consumers in the loop) to prefetches are non-blocking loads and, thus, do not stall the processor. By readying data for consumption by the modified loop 228, the prefetches at line 6 can hide memory latency.

The example code 220 can prevent memory faults without conditional code (e.g., line 3 of the example code 210 of FIG. 2B). The pre-execution loop 226 defines a terminating condition at line 4 to take a minimum value "min((j+PD), 128)" so to prevent use of indexes that can cause memory faults in the pre-execution loop 226. The modified loop 228 can use the same terminating condition so to prevent memory faults and be synchronized with the pre-execution loop 226.

It is noted that the prefetch directive, and the improved loop, are described as focusing on caching prefetched data to L2 cache. However, any level of cache can be designated for the prefetched data as long as the disclosed software pre-execution schemes can provide performance enhancements through reduction of memory stalls. For instance, L3 cache can be designated as a level of cache to store the prefetched data. A cache to which to prefetch data can be specified, for example, by a prefetch directive.

The improved loop of the example code 220 provides numerous advantages over the conventional loop in the example code 210 of FIG. 2B. First, the improved loop does not require conditional code since the pre-execution loop 226 accesses exactly the same data as the original loop. There is no opportunity for unnecessary memory faults. The pre-execution loop 226 keeps the compiler's task simple, reduces overhead, and preserves vectorization of the original loop. The pre-execution loop 226 is vectorizable and can benefit from reduced overhead offered by the SVE.

Second, the improved loop is independent of the size of the loop of interest (e.g., an original loop 208 in the example code 200 of FIG. 2A) even if the strip-mining factor (i.e., the prefetch distance) is greater than a size of the loop of interest. The example code 220 limits the loop of interest to 128 iterations but in practice a size of a loop of interest may be unknown at compile time because it is a value determined at runtime. As illustrated at line 4 of the example code 220, selecting a minimum value "min((j+PD), 128)" instructs processor cores to use the size of the loop in lieu of a large prefetch distance for a terminating condition and prefetch as far ahead as possible without causing a memory fault. Thus, the improved loop can hide memory latency even for short loops of interest and, thus, offer flexibility for loop sizes.

Third, the improved loop, with its directive to prefetch data to a L2 cache at line 6 can improve bandwidth utilization with L2 MSHRs (e.g., the L2 MSHRs 110 of FIG. 1) that are greater in number than L1 MSHRs (e.g., the L1 MSHRs 106A, 106B of FIG. 1). In addition, prefetching to the L2 MSHRs offers flexibility of using a large prefetch distance since typically L2 MSHRs are greater in number than L1 MSHRs. The flexibility of using a large prefetch distance complements the flexibility of loop sizes enabled with the improved loop. It should be appreciated that the present technology can be extended to cover more than two types of caches.

Figure 3:
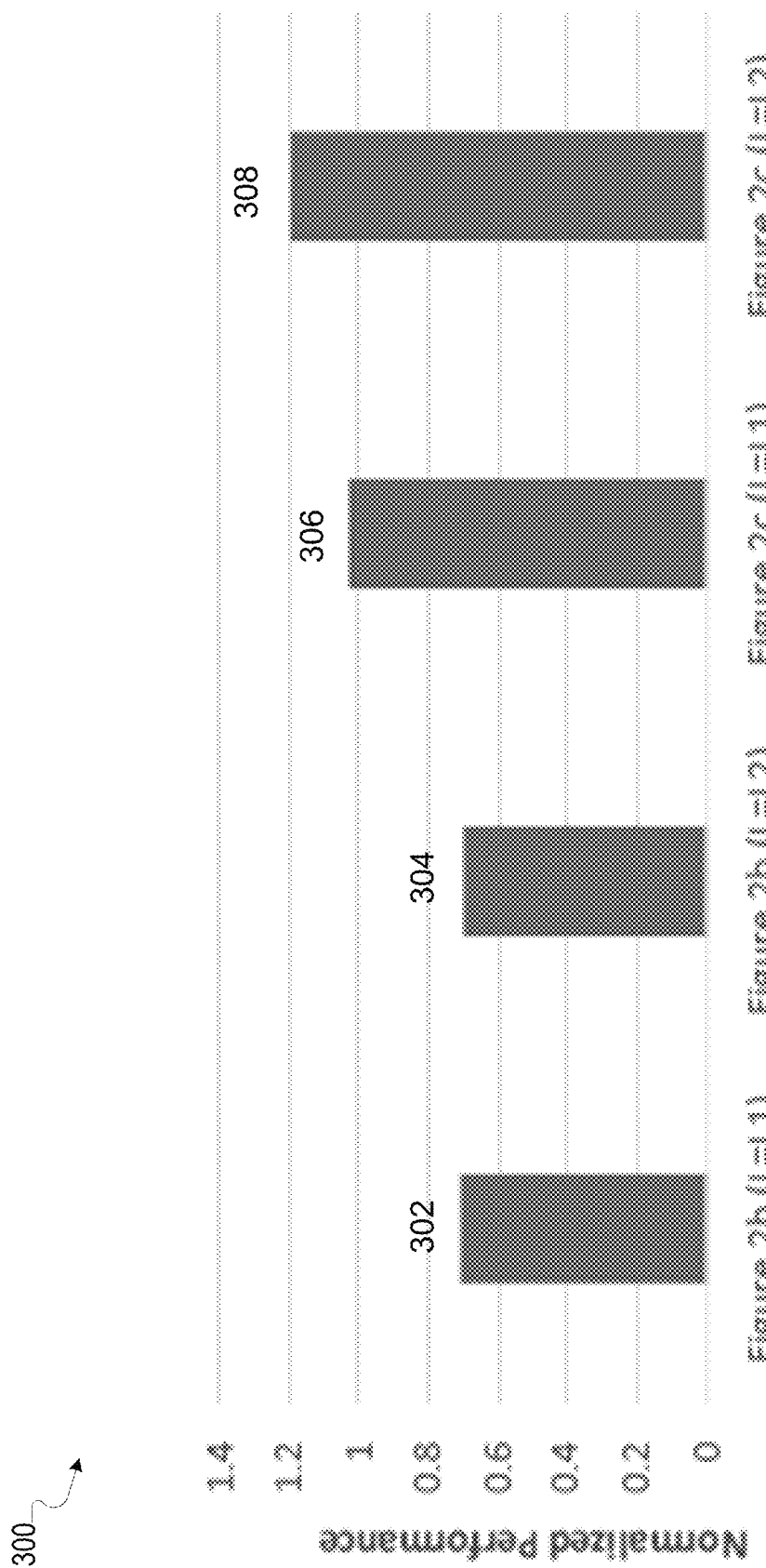
FIG. 3 illustrates performance improvements enabled by the improved loop in example code of FIG. 2C, according to an embodiment of the present technology.

FIG. 3 illustrates performance improvements enabled by the improved loop in the example code 220 of FIG. 2C, according to an embodiment of the present technology. FIG. 3 illustrates a chart 300 of normalized performances for the conventional loop of FIG. 2B and the improved loop of FIG. 2C. A first bar 302 shows normalized performance for the conventional loop that prefetches to a L1 cache. A second bar 304 shows normalized performance for the conventional loop that prefetches to a L2 cache. A third bar 306 shows normalized performance for the improved loop that prefetches to the L1 cache. A fourth bar 308 shows normalized performance for the improved loop that prefetches to the L2 cache. The bars 302, 304, 306, 308 are normalized to performance of the original loop of FIG. 2A without prefetching.

The first bar 302 and the second bar 304 illustrate that the conventional loop of FIG. 2B in fact performs about 30% worse than the original loop without prefetching. The degraded performances are caused by loss of vectorization and a small trip count (e.g., 128 for the "j"-loop in the example code 220). Thus, for irregular memory accesses, conventional approaches embodied in the conventional loop may make bandwidth utilization worse.

The third bar 306 illustrates that the improved loop executing the example code 220, when prefetching to a L1 cache (e.g., the L1 cache 104A of FIG. 1), offers the same or similar performance as the original loop. The same or similar performance is caused by a limited number of L1 MSHRs (e.g., the L1 MSHRs 110 of FIG. 1), which cannot hide memory latency typically associated with irregular memory accesses. The fourth bar 308 illustrates that prefetching to a L2 cache (e.g., the L2 cache 108 of FIG. 1) results in performance improvement of around 20% over the original loop. The performance improvement is caused by the greater number of L2 MSHRs (e.g., the L2 MSHRs 110 of FIG. 1). Thus, a software-based approach embodied in the example code 220 of FIG. 2C can result in significant performance improvements for irregular memory accesses.

FIG. 4 illustrates an example code 400 that applies software pre-execution to hash-join benchmark using proposed pragmas, according to an embodiment of the present technology. A "pragma" can be a hint or a directive to a compiler to automatically treat a portion of code in the hinted or directed manner. For instance, a pragma can hint or direct the compiler to automatically generate a pre-execution loop. The example code 220 of FIG. 2 illustrated generation of a pre-execution loop (e.g., software pre-execution) 226 and a modified loop 228 that can provide marked performance improvements for irregular memory accesses on indirect array references for RandomAccess benchmark. One of ordinary skill in the art, based on the present application, would readily understand that the software pre-execution can be generally applied to improve bandwidth utilization for other data structures and applications. For example, the software pre-execution can improve bandwidth utilization for codes involving multiple levels of indirection (e.g., xsbench benchmark), codes involving linked list traversals (e.g., hash-join benchmark), and codes where a compiler cannot easily determine a right reference to prefetch (e.g., graph 500 benchmark).

The example code 400 illustrates three stages involved in the software pre-execution. First, a loop of interest to which to apply the software pre-execution can be determined. In some embodiments, a compiler may determine the loop of interest with a directive (e.g., "prefetch_irregular" directive at line 5) or through a compiler option. In some embodiments, the compiler may automate the determination of the loop of interest. In the example code 400, the directive designates a loop at lines 6-13 as the loop of interest.

Second, a strip length (i.e., "n" at line 5) with which to strip-mine the loop of interest can be determined. The strip length can be identical to a prefetch distance. In some embodiments, a programmer may determine and provide the strip length. In some other embodiments, a strip length can be automatically calculated based on a length of the loop of interest (e.g., a short loop or a long loop) and/or processor architectural characteristics such as cache and translation lookaside buffer (TLB) sizes. The strip length is described with more details in reference to FIG. 6.

Third, exact references to prefetch with the software pre-execution within the loop of interest can be determined. In some embodiments, the references can be designated with a directive (e.g., "prefetch" directive at line 8). In some other embodiments, a compiler may fully automate the determination of the references to prefetch. As shown at line 8, the directive instructs a compiler to prefetch "bfs_tree[j]" but not "vlist". It is observed that prefetching the wrong reference or prefetching everything can lead to undesirable increase in prefetch overhead. For example, in the example code 400, if the compiler is to prefetch all references in the loop "vo", it will have to inherit conditional code of the original loop at line 9 and also prefetch "vlist", which contains only regular memory accesses and thus does not benefit from the software pre-execution. Similarly, any temporary variables used in intermediate memory address generations can be avoided from prefetching with a directive or as determined by a compiler. In some embodiments, as shown at line 8, a cache level to prefetch data to can be designated with a directive. Further, as shown at line 8, the directive can indicate a number of lines to prefetch so to alleviate a programmer from having to add a separate directive for every line to prefetch.

FIG. 5 illustrates a pseudo code 500 for implementing software pre-execution, according to an embodiment of the present technology. A compiler can implement the pseudo code 500 to generate a pre-execution loop and a modified loop from an original loop. In some embodiments, one or more directives (e.g., directives at lines 5 and 8 in the example code 400 of FIG. 4) can instruct the compiler to execute logic of the pseudo code 500.

The pseudo code 500 can broadly involve five stages. First stage 502 at lines 4-8 can strip-mine a loop of interest using a calculated or a user-provided strip-length. After the strip-mining, a modified loop can be generated at line 7. In the pseudo code 500, the modified loop is referred as "L" from line 9 onwards.

Second stage 504 at lines 9-10 can duplicate the modified loop "L" to generate a pre-execution loop "DL" (e.g., a duplicate loop that is to be added before the modified loop "L"). Thus, the pre-execution loop can have the same start and end conditions as the modified loop "L" (i.e., the strip-mined loop). The pre-execution loop "DL" can be inserted before the modified loop "L" as shown at line 10.

Third stage 506 at lines 11-16 can flatten all (or user-specified) loads and stores. The flattening of the loads and stores can involve replacing the loads and stores in the pre-execution loop "DL" with temporary variables. For example, the example code 500 uses a temporary variable "tmp" generated at line 13 to replace a load/store with the temporary variable at line 16. At lines 17 onwards, the loads and stores can be referenced using the temporary variables. Thus, stores that could to write out to a memory are instead stored in temporary variables. For instance, the example code 220 of FIG. 2C at lines 5 and 6 can be converted to statements that store "ran[pre]" and "Table[temp & (TableSize-1)]" to temporary variables.

Fourth stage 508 at lines 17-25 can identify references that are not used in the pre-execution loop "DL". In some embodiments, the references can be leaves of a dependence graph "FG" that do not have further dependencies. For instance, the pre-execution loop in the example code 220 of FIG. 2C contains a reference to "ran[pre]" at line 5 and a reference to "Table[temp & (TableSize-1)]" at line 6. The dependence graph "FG" can indicate that "ran[pre]" is a reference that is used later for "Table[temp & (TableSize-1)]" in the pre-execution loop. However, "Table[temp & (TableSize-1)]" is a reference that is not used in the pre-execution loop for further memory access or address generation. Thus, the example code 500 can identify "Table [temp & (TableSize-1)]" as a prefetch candidate reference.

Fifth stage 510 at lines 26-27 can convert one or more statements that store identified candidate references to temporary variables into prefetching statements. For instance, the pre-execution loop of the example code 220 of FIG. 2C has converted "temp=Table[temp & (TableSize-1)]" to "prefetch Table[temp & (TableSize-1)]".

It should be understood that there can be many variations or other possibilities, including additional or fewer stages and stages ordered differently.

Figure 6:
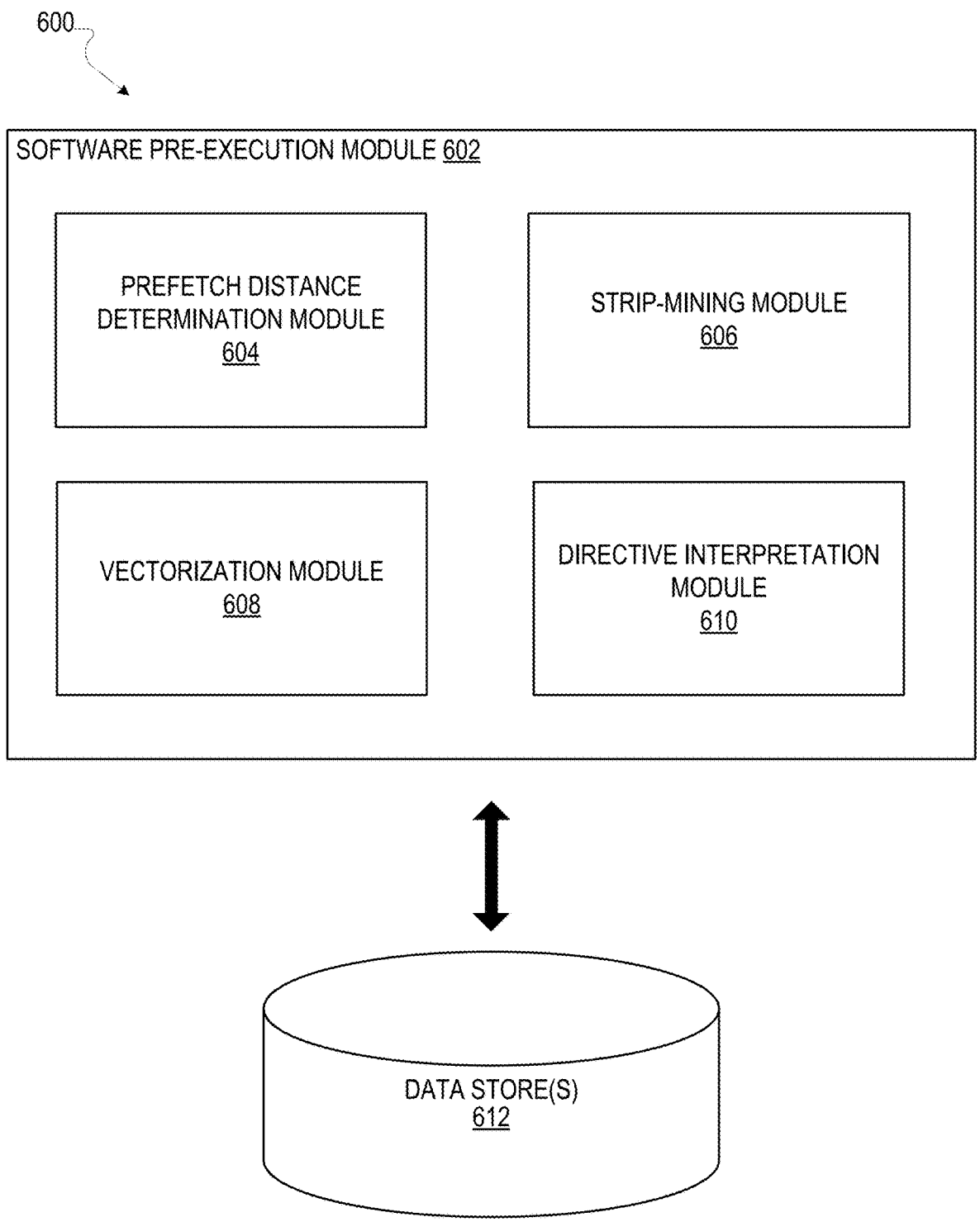
FIG. 6 illustrates an example system including a software pre-execution module, according to an embodiment of the present technology.

FIG. 6 illustrates an example system 600 including a software pre-execution module 602, according to an embodiment of the present technology. The software pre-execution module 602 can be configured to analyze an original loop and generate a pre-execution loop and a modified loop. In some embodiments, some or all functionalities of the software pre-execution module 602 can be implemented in a compiler. The software pre-execution module 602 can include a prefetch distance determination module 604, a strip-mining module 606, a vectorization module 608, and a directive interpretation module 610. In some instances, the example system 600 can include at least one data store 612. The components (e.g., modules, elements, etc.) shown in this figure and all figures herein are exemplary only, and other implementations may include additional, fewer, integrated, or different components. Some components may not be shown so as not to obscure relevant details.

In various embodiments, the software pre-execution module 602 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some instances, the software pre-execution module 102 can be, in part or in whole, implemented as software running on one or more computing devices or systems, such as on a server computing system or a client computing device. It should be understood that there can be many variations or other possibilities.

The software pre-execution module 602 can be configured to communicate and operate with at least one data store 612, as shown in the example system 600. The data store 612 can be configured to store and maintain various types of data maintained and used by the software pre-execution module 602. In some embodiments, the data store 612 can store information utilized by the software pre-execution module 102. For example, the data store 116 can store input files to be analyzed and output files containing modified code in accordance with the present technology. Additionally, the data store 612 can store a compiler that can modify the input code, various algorithms used in code analysis, and hardware component specifications (e.g., pinouts of processors and memories, processing capabilities, available caches, cache sizes, or the like). It should be understood that there can be many variations or other possibilities.

The prefetch distance determination module 604 can be configured to determine a prefetch distance (i.e., a strip length) for a pre-execution loop and a modified loop. For example, the strip-mining module 606 can implement functionalities of line 4 in the example code 500 of FIG. 5. In some embodiments, the prefetch distance can be received as a user input. In some other embodiments, the prefetch distance can be determined by a compiler at compile time. In yet some other embodiments, the prefetch distance can be determine by processor(s) at run time. An appropriate prefetch distance can prevent incoming prefetches to be neither too late (to not hide memory latency) nor too early (to risk eviction from a cache).

The prefetch distance can be determined based on various factors. One such factor influencing the prefetch distance can be sizes of caches. Benefits of prefetching to a larger L2 cache instead of a smaller L1 cache was described previously in relation to better hiding memory latency with larger L2 MSHRs. When the prefetch distance is larger than the L2 cache, then not all of the prefetched data can be stored on the L2 cache. Conversely, when the prefetch distance is too small, then the L2 cache and its larger L2 MSHRs may not be fully utilized. In some embodiments, the prefetch distance can be determined based on the size of the L2 cache. For instance, the prefetch distance may be half the size of the L2 cache such that an amount of data prefetched does not exceed the half the size of the L2 cache. For instance, a compiler can receive the size of the L2 cache based on a hardware definition and set the prefetch distance to half the size of the L2 cache at compile time. While a L1 cache and a L2 cache are compared, it should be understood that the present technology can broadly apply to additional levels of caches and the prefetch distance can be determined to account for the additional levels.

Another factor influencing the prefetch distance can be sizes of TLBs of corresponding caches. For instance, when the prefetch distance exceeds a number of entries in a L2 TLB and a dataset does not fully map into the L2 TLB, then memory accesses to data in a modified loop following a pre-execution loop can re-trigger L2 TLB misses. In some embodiments, to prevent the re-triggering of the L2 TLB misses, the prefetch distance can be determined based on a size of entries in the L2 TLB (e.g., a size of the L2 TLB). For instance, the prefetch distance can be restricted to half, three-fourth, one-third, or any portion of the number of entries in the L2 TLB. L2 TLB size is exemplary and it should be understood that the present technology can determine prefetch distance based on any TLB of any level of cache or combinations thereof. Further, a TLB can be specified and the prefetch distance can be determined based on the specified TLB.

The strip-mining module 606 can be configured to receive an original loop as an input and generate one or more strip-mined loops for the original loop. For example, the strip-mining module 606 can implement functionalities of line 7 in the example code 500 of FIG. 5.

The vectorization module 608 can be configured to determine whether a loop is vectorizable and, if so, vectorize the loop. For instance, a pre-execution loop and a modified loop can be vectorized by the vectorization module 608. Vectorized prefetching of irregular memory references in the pre-execution loop may require specialized hardware support (e.g., SVE supported by A64FX processors). As described, vectorization of the pre-execution loop and the modified loop can significantly improve performance in irregular memory accesses by more than 20%.

The directive interpretation module 610 can be configured to interpret one or more directives in an input code to provide special handling of some portions of the input code before compilation (e.g., preprocess the input code) of the input code. The directives can instruct a compiler to prefetch certain data (e.g., line 6 of the example code 220 of FIG. 2), designate a level of cache to which to store the prefetched data (e.g., line 6 of the example code 220 of FIG. 2), indicate a particular loop to modify with software pre-execution (e.g., line 5 of the example code 400 of FIG. 4), or the like.

Figure 7:
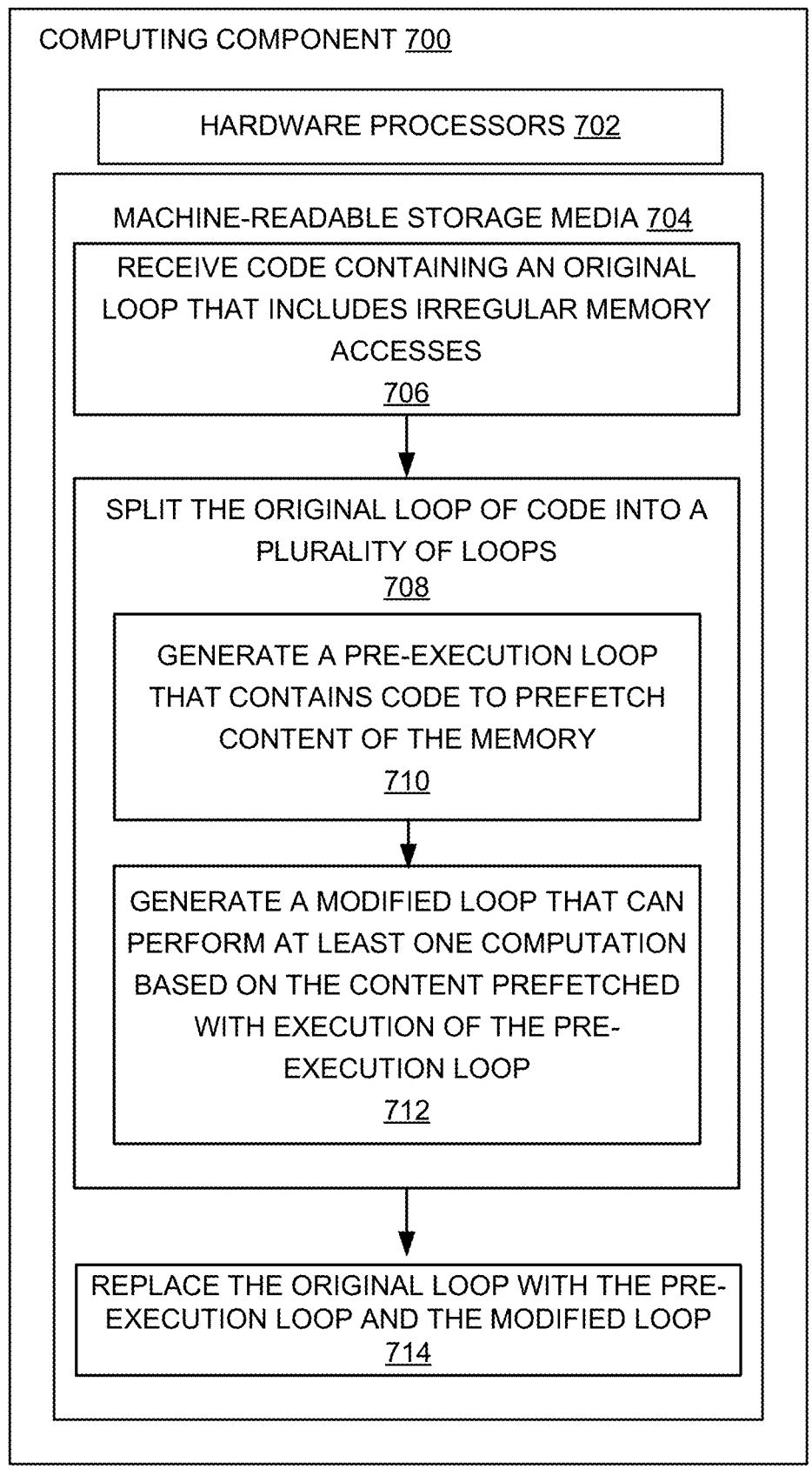
FIG. 7 illustrates a set of executable instructions stored in machine-readable storage media that, when executed, cause one or more hardware processors to perform an illustrative method for reducing stalls caused by irregular memory access with software pre-execution, according to embodiments of the present technology.

FIG. 7 is an example computing component 700 that may be used to implement various features of software pre-execution in accordance with one embodiment of the disclosed technology. Computing component 700 may be, for example, a server computer, a controller, or any other similar computing component capable of processing data. In the example implementation of FIG. 7, the computing component 700 includes a hardware processor 702, and machine-readable storage medium 704.

Hardware processor 702 may be one or more central processing units (CPUs), semiconductor-based microprocessors, and/or other hardware devices suitable for retrieval and execution of instructions stored in machine-readable storage medium 704. Hardware processor 702 may fetch, decode, and execute instructions, such as instructions 706-714. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-714.

Hardware processor 702 may execute instruction 706 to receive code containing an original loop that includes irregular memory accesses.

Hardware processor 702 may execute instruction 708 to split the original loop into a plurality of loops. The splitting of the original loop can comprise generation of a pre-execution loop and a modified loop.

Hardware processor 702 may execute instruction 710, as part of the instruction 708, to generate the pre-execution loop that contains code to prefetch content of the memory. Execution of the pre-execution loop can access memory inclusively between a starting location and the starting location plus a prefetch distance.

Hardware processor 702 may execute instruction 712, as part of the instruction 708, to generate the modified loop that can perform at least one computation based on the content prefetched with execution of the pre-execution loop. Execution of the main loop is to follow the execution of the pre-execution loop.

Hardware processor 702 may execute instruction 714 to replace the original loop with the pre-execution loop and the modified loop.

Figure 8:
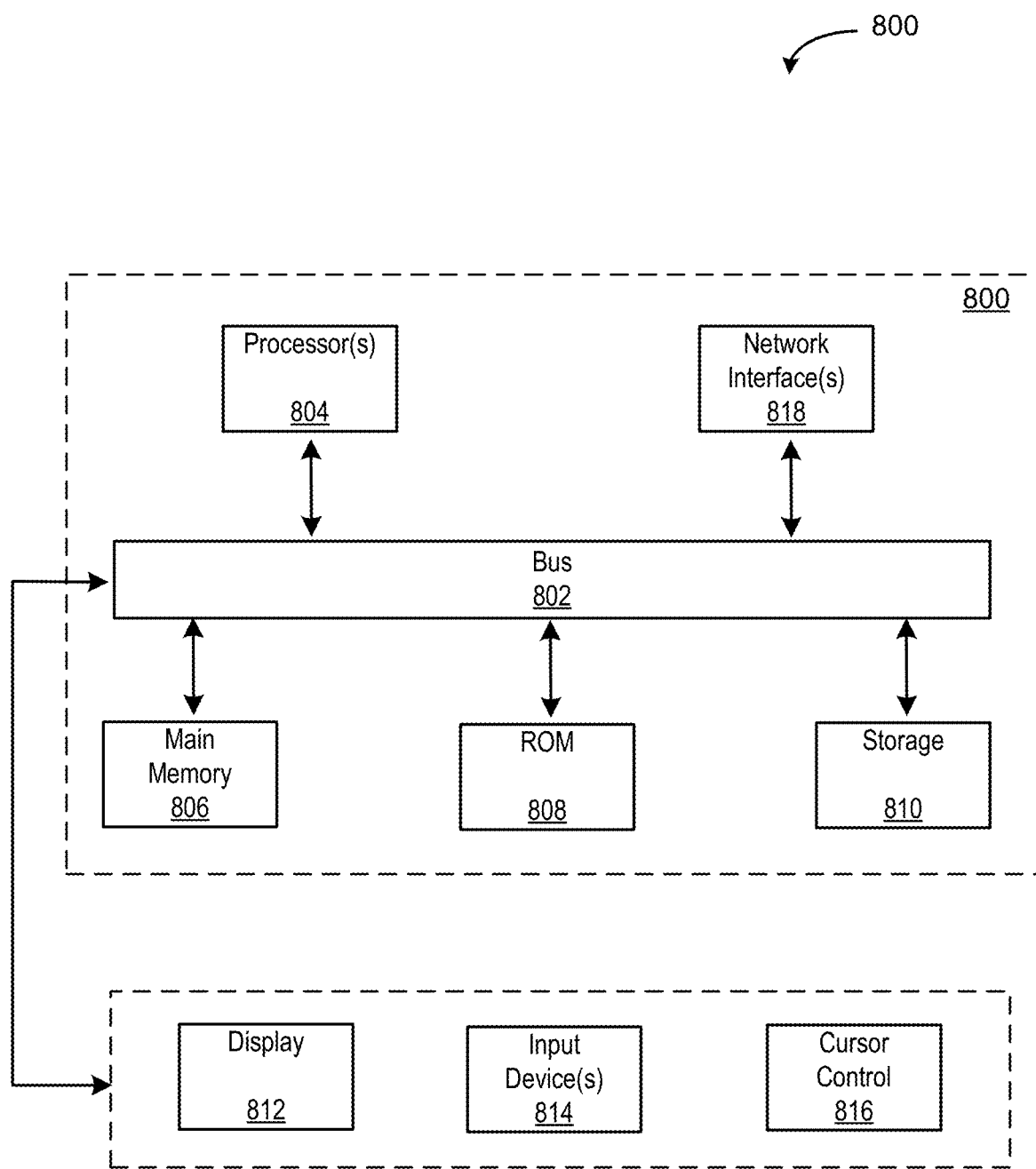
FIG. 8 is an example computing component that may be used to implement various features of embodiments described in the present technology.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
    receiving, by a computing system, code containing an original loop that includes irregular memory accesses;
    splitting, by the computing system, the original loop into a plurality of loops, the splitting comprising:
        generating a pre-execution loop that contains code to prefetch content of the memory, wherein execution of the pre-execution loop can access memory inclusively between a starting location and the starting location plus a prefetch distance; and
        generating a modified loop that can perform at least one computation based on the content prefetched with execution of the pre-execution loop, wherein execution of the main loop is to follow the execution of the pre-execution loop; and
    replacing, by the computing system, the original loop with the pre-execution loop and the modified loop.

2. The method of claim 1, wherein:
    the pre-execution loop comprises memory accesses and corresponding address generation of the original loop,
    the generating the pre-execution loop comprises:
        strip-mining the original loop with the prefetch distance; and
        converting at least one last memory operation into a prefetch operation, and
    the generating the modified loop comprises:
        strip-mining the original loop with the prefetch distance.

3. The method of claim 2, wherein the generating the pre-execution loop comprises:
    generating a dependence graph of the memory accesses and the corresponding address generation of the original loop; and
    determining the at least one last memory operation based on the dependence graph.

4. The method of claim 1, wherein the memory is a high bandwidth memory (HBM), and the pre-execution loop prefetches the content of the memory into a specified cache.

5. The method of claim 1, wherein the pre-execution loop does not include conditional logic that prevents an out of bounds memory access based on a loop counter and the prefetch distance.

6. The method of claim 1, wherein the pre-execution loop is vectorizable with a hardware support provided for a processor that is to execute the pre-execution loop.

7. The method of claim 1, wherein the irregular memory accesses involve multiple levels of indirection.

8. The method of claim 1, wherein the content is prefetched into a specified cache based on a directive.

9. The method of claim 1, wherein the prefetch distance is determined based on a size of a specified cache.

10. The method of claim 1, wherein the prefetch distance is determined based on a size of a specified translation lookaside buffer (TLB).

11. A system comprising:
at least one processor; and
a memory storing instructions that, when executed by the at least one processor, cause the system to perform:
receiving code containing an original loop that includes irregular memory accesses;
splitting the original loop into a plurality of loops, the splitting comprising:
generating a pre-execution loop that contains code to prefetch content of the memory, wherein execution of the pre-execution loop can access memory inclusively between a starting location and the starting location plus a prefetch distance; and
generating a modified loop that can perform at least one computation based on the content prefetched with execution of the pre-execution loop, wherein execution of the main loop is to follow the execution of the pre-execution loop; and
replacing the original loop with the pre-execution loop and the modified loop.

12. The system of claim 11, wherein:
the pre-execution loop comprises memory accesses and corresponding address generation of the original loop,
the generating the pre-execution loop comprises:
strip-mining the original loop with the prefetch distance; and
converting at least one last memory operation into a prefetch operation, and
the generating the modified loop comprises:
strip-mining the original loop with the prefetch distance.

13. The system of claim 12, wherein the generating the pre-execution loop comprises:
generating a dependence graph of the memory accesses and the corresponding address generation of the original loop; and
determining the at least one last memory operation based on the dependence graph.

14. The system of claim 11, wherein the memory is a high bandwidth memory (HBM), and the pre-execution loop prefetches the content of the memory into a specified cache.

15. The system of claim 11, wherein the pre-execution loop does not include conditional logic that prevents an out of bounds memory access based on a loop counter and the prefetch distance.

16. A non-transitory computer-readable storage medium including instructions that, when executed by at least one processor of a computing system, cause the computing system to perform:
receiving code containing an original loop that includes irregular memory accesses;
splitting the original loop into a plurality of loops, the splitting comprising:
generating a pre-execution loop that contains code to prefetch content of the memory, wherein execution of the pre-execution loop can access memory inclusively between a starting location and the starting location plus a prefetch distance; and
generating a modified loop that can perform at least one computation based on the content prefetched with execution of the pre-execution loop, wherein execution of the main loop is to follow the execution of the pre-execution loop; and
replacing the original loop with the pre-execution loop and the modified loop.

17. The non-transitory computer-readable storage medium of claim 16, wherein:
the pre-execution loop comprises memory accesses and corresponding address generation of the original loop,
the generating the pre-execution loop comprises:
strip-mining the original loop with the prefetch distance; and
converting at least one last memory operation into a prefetch operation, and
the generating the modified loop comprises:
strip-mining the original loop with the prefetch distance.

18. The non-transitory computer-readable storage medium of claim 17, wherein the generating the pre-execution loop comprises:
generating a dependence graph of the memory accesses and the corresponding address generation of the original loop; and
determining the at least one last memory operation based on the dependence graph.

19. The non-transitory computer-readable storage medium of claim 16, wherein the memory is a high bandwidth memory (HBM), and the pre-execution loop prefetches the content of the memory into a specified cache.

20. The non-transitory computer-readable storage medium of claim 16, wherein the pre-execution loop does not include conditional logic that prevents an out of bounds memory access based on a loop counter and the prefetch distance.

* * * * *